(12) United States Patent
Agado

(10) Patent No.: US 11,612,147 B1
(45) Date of Patent: Mar. 28, 2023

(54) FISH EGG INCUBATOR TRAY AND AN OUTER COVER DESIGNED FOR HIGH INCUBATING YIELD IN A NATURAL MOUNTAIN STREAM

(71) Applicant: Jaime Agado, Pocatello, ID (US)

(72) Inventor: Jaime Agado, Pocatello, ID (US)

(*) Notice: Subject to any disclaimer, the term of this patent is extended or adjusted under 35 U.S.C. 154(b) by 0 days.

(21) Appl. No.: 17/960,059

(22) Filed: Oct. 4, 2022

Related U.S. Application Data

(63) Continuation of application No. 17/885,249, filed on Aug. 10, 2022.

(51) Int. Cl.
*A01K 61/17* (2017.01)

(52) U.S. Cl.
CPC .................... *A01K 61/17* (2017.01)

(58) Field of Classification Search
CPC ........ A01K 61/00; A01K 61/17; A01K 61/20; A01K 61/30; A01K 61/40; A01K 61/50; A01K 61/51; A01K 61/53–61/57; A01K 61/60

See application file for complete search history.

(56) References Cited

U.S. PATENT DOCUMENTS

| | | | |
|---|---|---|---|
| 3,024,764 A * | 3/1962 | Brittain | A01K 61/17 119/218 |
| 3,724,423 A | 4/1973 | Day et al. | |
| 3,886,902 A | 6/1975 | Haynes | |
| 3,886,905 A * | 6/1975 | McNeil | A01K 61/17 119/217 |
| 4,014,293 A * | 3/1977 | Salter | A01K 61/17 119/218 |
| 4,094,270 A * | 6/1978 | Whitlock | A01K 61/70 220/6 |
| 4,195,436 A * | 4/1980 | Moure | A01K 69/08 43/100 |
| 4,214,551 A | 7/1980 | McNeil et al. | |
| 4,370,947 A | 2/1983 | Hilken | |
| 4,720,020 A * | 1/1988 | Su | B65D 11/1826 220/6 |
| 4,903,636 A | 2/1990 | Kroeker | |
| 4,915,059 A | 4/1990 | Long | |
| 6,138,863 A * | 10/2000 | Aiken | B65D 43/164 206/508 |

* cited by examiner

*Primary Examiner* — Ebony E Evans
(74) *Attorney, Agent, or Firm* — Mark V. Loen

(57) ABSTRACT

The embodied invention utilizes an incubation tray that is housed inside an outer assembly that protects incubating fish in the initial stages of their life cycle. The outer assembly is designed to allow water to flow into the incubation tray so there is a more natural environment for growth, and yet provide robust protection against predators. The outer assembly is designed to manage water flow around the incubation tray and prevent silt build up and ensure a stable position in a river. The goal is to re-establish a critical amount of new fish in a river where they have become sparce or extinct.

18 Claims, 5 Drawing Sheets

FISH EGG INCUBATOR TRAY AND AN OUTER COVER DESIGNED FOR HIGH INCUBATING YIELD IN A NATURAL MOUNTAIN STREAM

RELATED APPLICATIONS

This application is a continuation of application Ser. No. 17/885,249 files on Aug. 10, 2022. The prior application is incorporated by reference herein.

STATEMENT OF GOVERNMENT INTEREST

Not applicable.

FIELD AND BACKGROUND OF THE INVENTION

(1) Field of the Invention

This invention is directed to the establishment of fish in a river by placing fertilized fish eggs in a fish tray that provides protection and their initial growth stage.

(2) Description of Related Art

The life cycles of ocean fish that grow in freshwater, may take several years. Due to the difficulties with river pollution, etc, a number of rivers on the east coast of the U.S. have suffered a loss of natural fish. In particular, this applies to native Salmon.

Even though the Salmon have an average five year life cycle, important parts of their lives take place in freshwater. The cycle of salmon fish begins in freshwater rivers, when a redd, or a female's nest of eggs, is fertilized. The female usually creates a small gravel depression in the fall and buries the eggs under a cover of gravel. These eggs remain buried throughout the winter, and the embryos develop. In the spring, the eggs hatch and alevins emerge. These are tiny fish with the yolk sac of the egg attached to their bellies. Alevins stay close to the redd for a few months. When they have consumed all of their yolk sac and have grown in size, these fish emerge from the gravel, and are called fry.

Fry swim in the river and feed. Fry can spend up to a year or more in their birth stream, depending upon the particular type of salmon. Some head directly to sea. Eventually, all the fry migrate downstream towards the oceans. Some float down and some actively swim. They continue feed heavily as their bodies adjust to the new conditions of the ocean.

Some salmon remain in coastal water, others migrate northward to feedings grounds. Salmon may spend one to seven years in the ocean before journeying back to their birth streams to spawn. It is not known exactly how salmon find their birth rivers. Upon reaching natal streams, females build nests, or redds and the males fertilize the eggs. Eventually, the elder male and female fish die.

Atlantic salmon are vulnerable to many stresses and threats, including dams and culverts that block or impede the migratory movements, habitat degradation, commercial fishing, and poor marine survival.

Several sources indicate the need for the Salmon to be environmentally protected, as per current website postings.

From the National Oceanic and Atmospheric Administration, U.S. Department of Commerce: Atlantic salmon in the United States were once native to almost every coastal river northeast of the Hudson River in New York. But dams, pollution, and overfishing reduced their population size until the fisheries closed in 1948. Commercial and recreational fishing for wild sea-run Atlantic salmon is still prohibited in the United States. All Atlantic salmon in the public market is cultured and commercially grown. Currently, the only remaining wild populations of U.S. Atlantic salmon are found in a few rivers in Maine. These remaining populations comprise the Gulf of Maine distinct population segment, which is listed as endangered under the Endangered Species Act. Some populations in southern Canada and Europe are also declining significantly, creating concern about the status of this species globally. In addition, the Gulf of Maine DPS is one of eight Species in the Spotlight. This means that NOAA Fisheries has made it a priority to focus recovery efforts on research to better understand the major threats and stabilize the Gulf of Maine DPS by improving access to quality habitat and thus, preventing its extinction.

From the U.S. Environmental Protection Agency—Working with Tribal Partners to Restore Fisheries in Northern Maine: Native American tribes in Maine have traditionally fished migrating and resident fish species, including Atlantic salmon, as a key part of their diet. However, over time, these traditional practices have been negatively impacted by industrial development which has caused decreasing water quality, loss of fish habitat, and obstacles to fish migration pathways. Additionally, interbreeding wild Atlantic salmon with less genetically-diverse domesticated and farm-raised salmon has caused reduced fitness and adaptability of wild Atlantic salmon. The decline, and in some cases the elimination, of these important fish populations has meant the loss of a central component of tribes' traditional diet.

It is highly desirable to re-establish salmon fish in rivers and streams where they have become extinct. It is important that the eggs used to re-establish a species into a river have a successful environment to emerge safely through the egg, alevins, and fry part of the growth cycle. It is difficult to replicate the redd environment created by a female fish, as it is too labor intense. Manually re-creating the redd environment by digging into gravel also lacks the scale necessary to create a critical mass of fish that will re-establish a sustainable and natural growth cycle.

SUMMARY OF THE INVENTION

The embodied invention utilizes a covered incubation tray that is housed inside an outer protective assembly to protect embryonic and young fish in the initial stages of their life cycle. The outer assembly is designed to allow water to flow into the incubation tray so there is microbic food and a more natural environment for growth, and yet provide robust protection against predators. The outer assembly is designed to manage water flow around the incubation tray and prevent silt build up and ensure a stable position in a river. The goal is to re-establish a critical amount of new fish in a river where they have become extinct.

DETAILED DESCRIPTION OF THE INVENTION

To address the outlined needs, a number of practical trials were undertaken to understand how to re-create a redd environment which protect the fish in their early stages when in a natural river. The design is based on various practical difficulties which were observed, and numerous changes were made to address proper water flow, silt, water circulation around eggs and alevins. The goal of the invention is to create an environment where a high percentage of the fertilized eggs reach the fry stage.

The embodied features of the invention are directed toward large fish, especially Atlantic salmon, and similar sized fish with similar life cycles. The fish grow up in a particular stream or river that becomes home, and their natural instincts return them there to spawn. Thus, the benefits of the invention provide for re-establishment of fish to a natural river, but only if the river can provide the environment for repeated life cycles of successful spawning. Salmon is considered an indicator of a healthy stream and failure to re-establish salmon in a stream indicates there is need for corrective action.

The term 'incubating fish' means fish in the egg, alevins, and fry stages of their life cycle.

Figure 1:
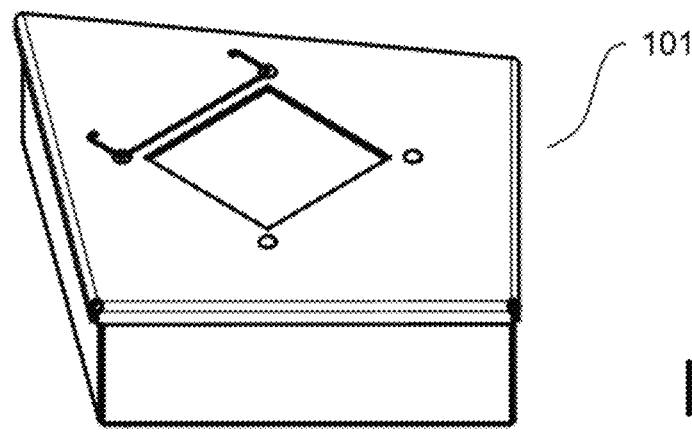
FIG. 1 shows the egg incubator inner housing.
Figure 2:
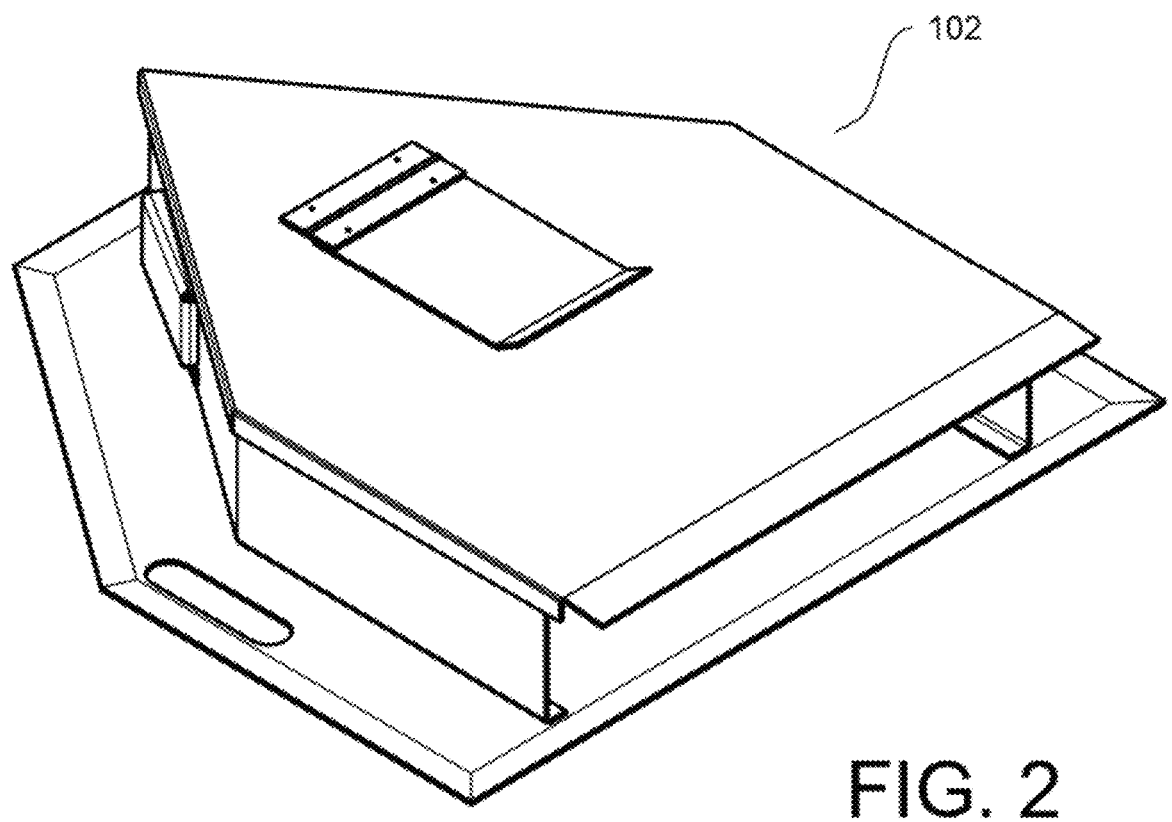
FIG. 2 shows the egg incubator outer housing.

FIG. 1 shows an inner incubator housing 101 with a top cover that includes a hinge so it may be opened. FIG. 2 shows an outer housing 102 for the inner incubator and a lid that provides for convenient inspection of the fish to determine the health of the alevins or fry stage of their cycle. The outer housing provides a number of important protective and practical features that facilitate salmon growth, stream placement, and development of their life cycle for about six months. When they have reached the fry stage, a person opens up the outer and incubation covers, and releases the frys into the river to find food and grow.

It is a preferred practice to introduce a small number of river rocks into the incubation tray to provide a more natural environment for the incubating fish, and also to provide some natural agitation to the water flowing around the eggs. This avoids problems where the eggs continually touch each other and mold.

Figure 3:
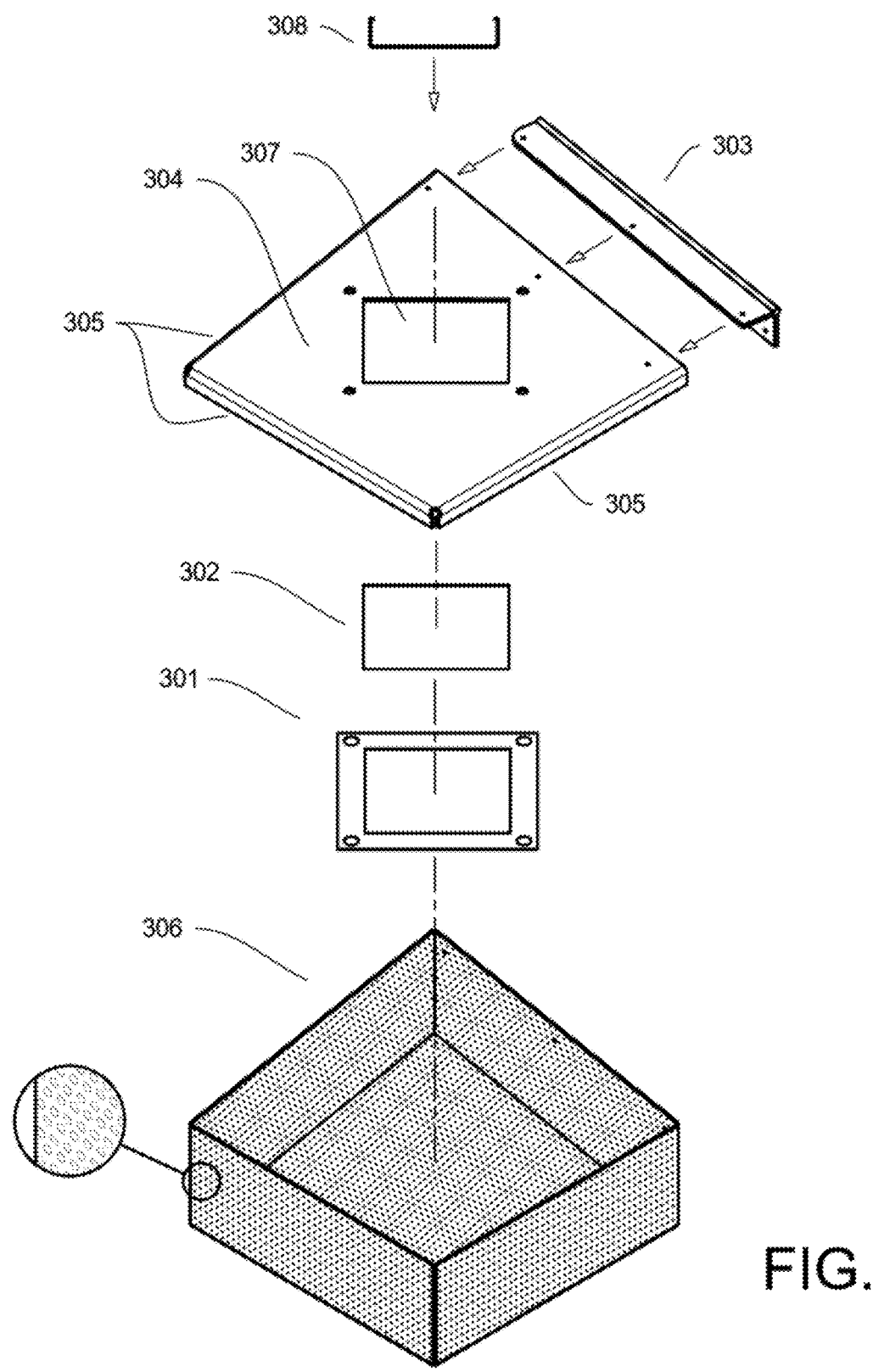
FIG. 3 shows the egg incubator inner housing in an exploded view.

FIG. 3 shows the inner incubator assembly of FIG. 1 in an exploded view. Starting from the bottom, a bottom egg tray 306 is made from a perforated sheet of aluminum, with holes about ⅛" in diameter. Preferably, it is fashioned from a single plate about 0.1" thick and the sides are folded upward in a metal bending operation. Aluminum is preferred for corrosion resistance and sturdiness for transport and protection from any large animal that may step on it.

The bottom tray is designed to loosely fit into the outer cover so that water flows easily around it. It is designed to be mildly elongated toward the direction of the incoming river water flow. The flow around the inner incubator is discussed in FIG. 6.

The bottom incubation tray 306 has a top cover plate 304 that is connected to a hinge 303 which is also connected to the upper right side of the bottom tray. The cover 304 includes a glass or clear plastic inspection window 302 and a frame 301 which secures the window to the bottom of the window opening 307. This provides the ability to monitor the fish without touching. The window is critical to avoid contaminating their environment to achieve optimum results. The top cover includes 90 degree fold down edges 305 to better enclose the top cover 304 over the bottom tray 306. The bend provides a flat, strong, and stiff edge. This prevents the incubating fish (eggs, alevins, and frys) from escaping or getting stuck in a crevasse. A handle 308 provides easy access to the bottom incubation tray 306.

The bottom incubation tray preferably includes small holes or openings that allow uniform water flow through it. A preferred structure is a uniformly perforated plate, where the perforations are circles. Alternately, other perforation geometries can be used, which includes but not limited to squares, ellipses, slots, and the like.

Figure 4:
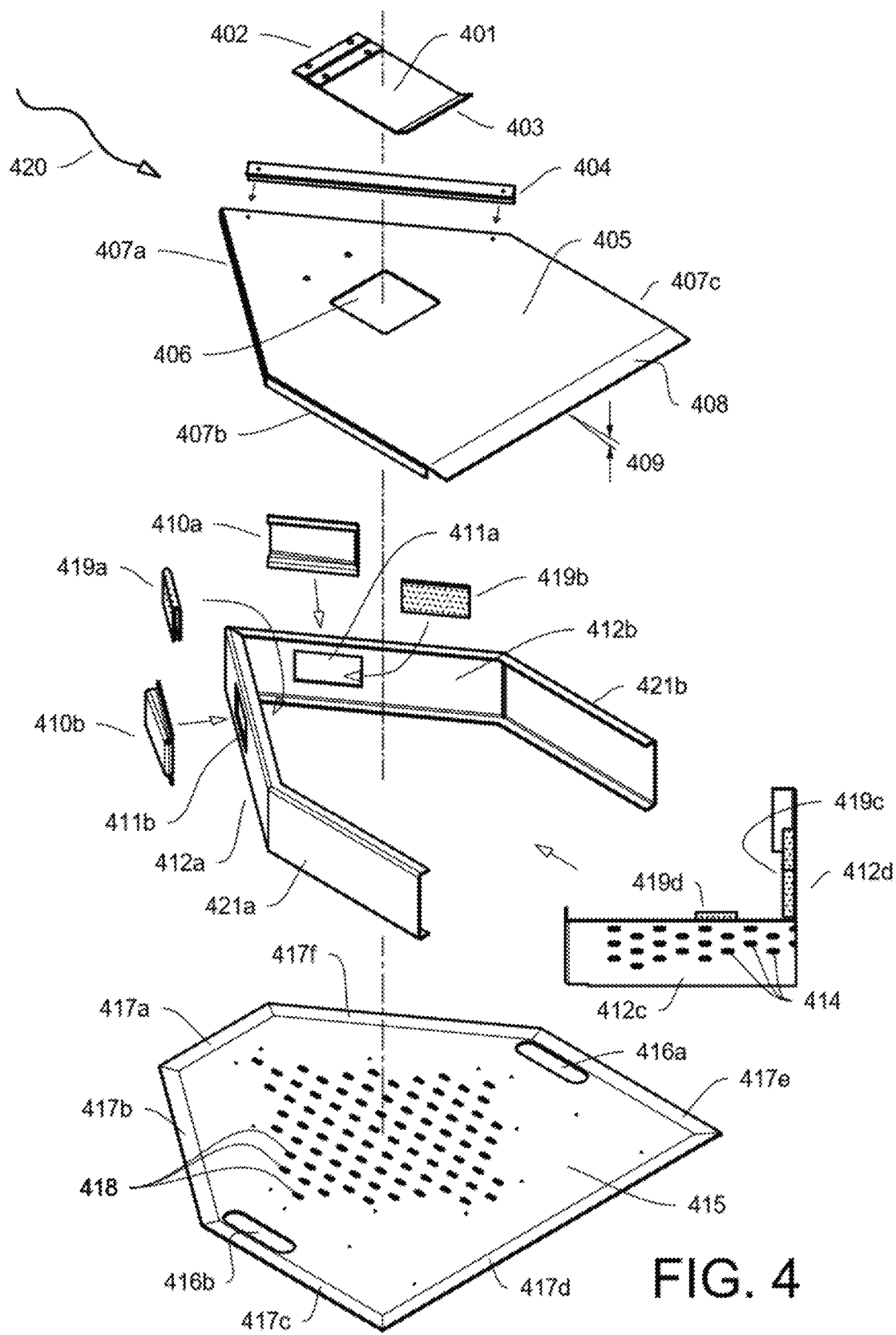
FIG. 4 shows the egg incubator outer housing in an exploded view.

FIG. 4 shows the top housing cover assembly in an exploded view. A bottom panel 415 is connected to forward side panels 412*a,b* and rearward side panels 412*c,d* which are both positioned under a top cover 405. The rearward side panels 412*c,d* include water flow openings 414. A pair of water guiding panels 421*a,b* are positioned behind, and connected to, the forward side panels 412*a,b*.

The top cover 405 is connected to the side panel 412 by a hinge 404. The top cover includes an inspection opening 406 that is covered by a lid 401. A hinge 402 connects a lid 401 to the top cover and provides easy access to the inspection window 302 of FIG. 3.

The design of the bottom plate includes perimeter edges 417*a,b,c,d,e,f* that are bent downward by about 5 degrees to provide important anchoring to the bottom of the river. The angle is preferably 5 degrees with a range as much as 7 degrees. The bent edges utilize the hydraulic pressure of the river to push the plate downward and naturally secure it to the river bed. Without the perimeter bending, the bottom plate easily catches flow on the bottom side and became more like a 'kite' and does position steadily on the bottom of a river.

The bottom plate includes slots 416*a,b* which provide for material handling. They allow multiple outer cover assemblies to be well stacked. Also, the slots provide for better transport carry by a person over the rugged terrain of a mountain area, commonly above a 5,000 foot elevation. Two or three can be readily secured to a backpack by using straps.

The bottom plate also includes slotted openings 418 of ¼" wide×⅝" long. These slots allow for a small amount of downward water flow through the egg tray which prevent minor amounts of silt from building up. The river water flow 420 in FIG. 4 is from the upper left.

The side panel assembly includes two openings 411*a,b* that provide for entry water flow inside the outer cover assembly. Entry louvers 410*a,b* are angled about 4-5 degrees away from the side panel openings to catch and direct river water flow into and around the bottom incubator tray 306 of FIG. 3. The side panel also includes spacers 419*a,b* which are mounted against the inside of the panel openings 410*a,b* respectively. The rear panels 412*c,d* also include similar spacers 419*c,d*. The spacers 419*a,b,c,d* centralize the bottom incubator tray between the side panels 412 and the rear panels 412*c,d*. The spacers are made from the same or similar perforated aluminum as the bottom tray, and the perforated holes provide large object filtration and small fish blocking on the entry river flow water.

The rear panels 412*c,d* include similar slots 414 as the bottom plate slots 418 to allow controlled flow through the rear panel. Note that the number of slots decrease toward the center of the rear panel. This provides increased flow on the outer edges of the rear panel which better controls silt build up.

The top cover plate 405 has an inspection window opening 406 and a covering lid 401 which is hinged 402 to the top cover plate 405. The reward edge 403 of the covering lid 401 is bent up by about 30 degrees which protrudes into the river water flow 420. This creates hydraulic pressure upon the lid and keep it closed so that other fish and debris do not get into the assembly.

Note that the downstream edge 408 of the cover plate is also bent down by about 5 degrees 409. This also helps to anchor the whole assembly on the bottom of the river. Additionally, by bending the rearward edge 408 downward also aids in controlling silt and small particle build up behind the assembly. Silt tends to build up behind the assembly, not in the front, and the bent edge disturbs the water flow pattern which creates silt buildup.

The top cover plate also includes 90 degree fold edges 407a,b,c on three sides for a better enclosure to the side panel 412 and the rear panels 412c,d. Again, a folded bend provides a flat, strong, and stiff edge.

The entire outer cover assembly is preferably connected together by solid rivets. Other connecting hardware could also be used. Alternately, the bottom plate 415, side panels 412a,b, rear panels 412c,d and top cover 405 are welded together.

Figure 5:
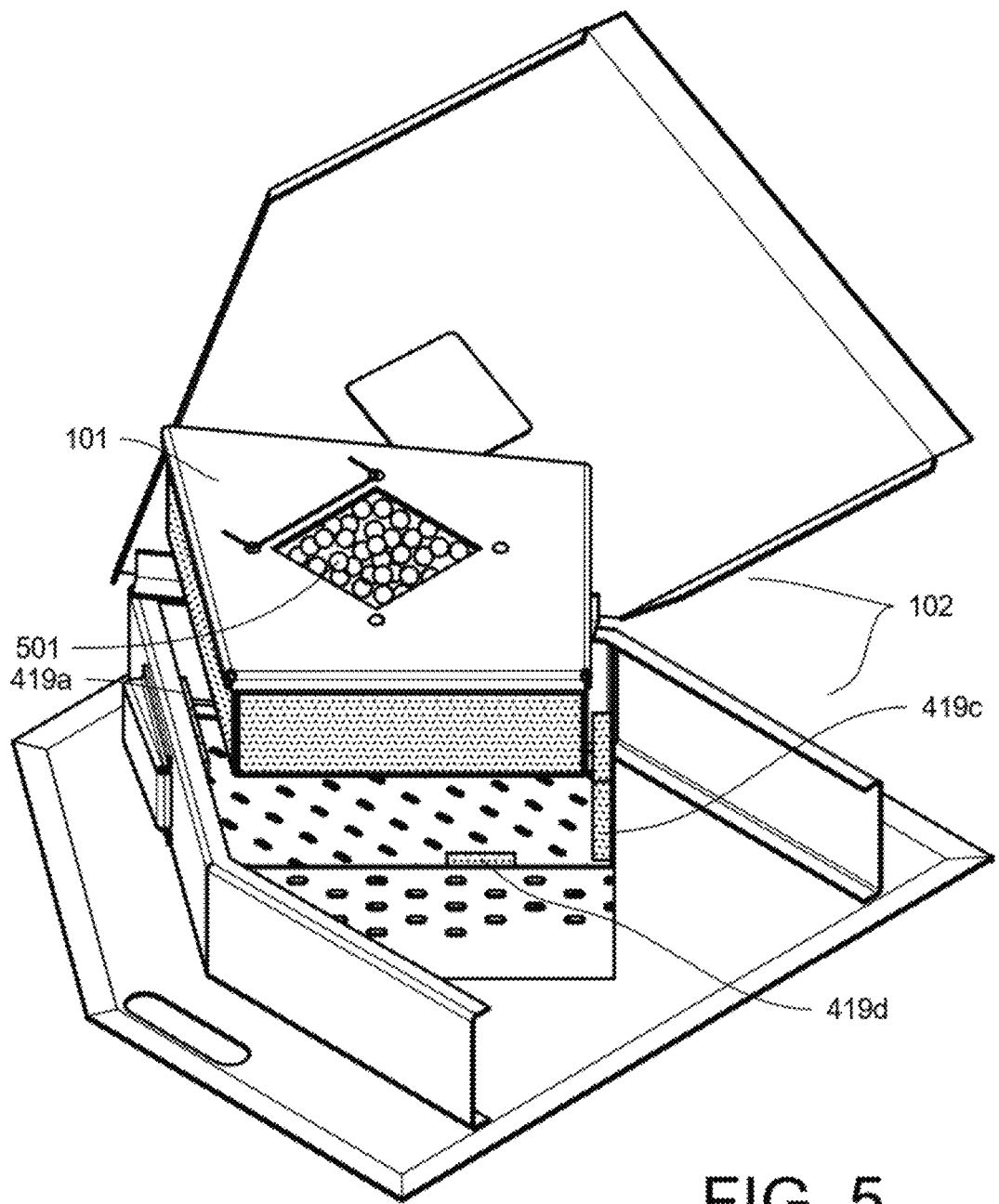
FIG. 5 shows how the inner housing fits inside the outer housing when the outer cover lid is opened.

FIG. 5 shows the inner housing assembly 101 being places into the outer housing assembly 102 being assembled with the fertilized eggs 501. Note spacers 419a,c,d (and spacer 419b not shown), are also called centralizers, and provide for a centralized fit between the inner incubator assembly into the outer housing assembly.

Figure 6:
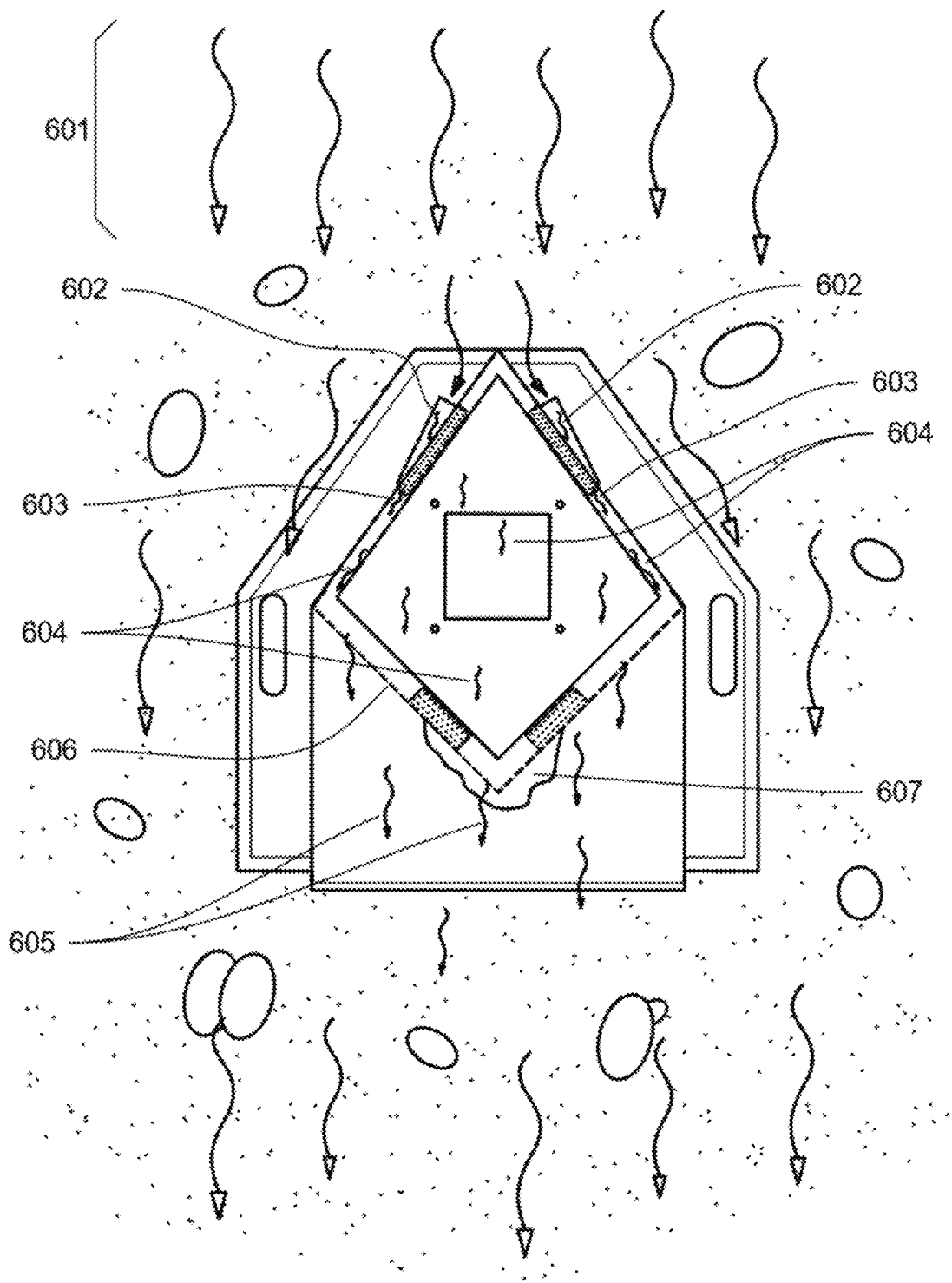
FIG. 6 shows how water flows around the inner and outer housings with the outer cover not shown for illustration purposes.

FIG. 6 illustrates river flow 601 around the outer cover assembly (top cover not shown for illustrative purposes) and the inner housing assembly. Louvers 602 provide for entry water 603 into the overall assembly. The water flows around the inner housing assembly 602, exits 606 through the rear panel, and the flows through 605 the space rearward to the rear panel, and then back into the river. An inspection window 604 on incubator top cover is shown.

In the embodied design, some silt 607 has a tendency to build up on top of the bottom panel just after the read panel. Some silt is tolerated as long as it does not get into the incubator tray. As already mentioned a small amount of water flow goes downwardly through the incubator tray and the bottom panel slots. This greatly aids in preventing silt in the incubator tray.

The inner incubator assembly and the outer cover assembly are preferably made from metal for strength, weight, and corrosion protection. Aluminum is preferred, but it could also be a steel such as galvanized or stainless steel. This preference should not be considered restrictive as it would be possible to construct it out of various plastics that are suitable for a river environment and make various modifications to provide similar strength and anchoring capability.

The preferable placement of the overall assembly is in a rocky or gravel location in the river that is clear of silt deposits. It is placed 6 to 12 inches below the water surface. Typically, the outer assembly is weighted down with available river rocks on the perimeter to ensure the assembly stays in place.

An important feature of the incubation and cover assemblies is to provide clean and continuous water flow. This prevents any eggs that do not hatch from spoiling the other eggs from fungus and avoids other problems of egg adhesion to the structure or each other.

The assembly is designed for very low maintenance, and is able to stay in the same place for months without the need for re-positioning, cleaning, or maintenance due to its rugged design. The internal water flow is designed to avoid silt buildup. Experience so far demonstrates that the fry state is achieved from egg state at levels over 99%.

The incubation tray can hold up to 7,000-8,000 eggs in a typical design. It can be scaled up to much larger amounts by increasing the size. However, if there is a need for biological traceability and avoiding cross contamination, this would restrict the tray size to what one or two females produce. Further, a larger size will require an larger area in a stream and placement can be difficult. Finally, a larger size is also heavier, and would be more difficult to carry by backpack to suitable streams at high elevations.

Inspection may be needed due to river conditions, such as temperature or problems upstream (i.e. landslide, water diversion, upstream water contamination, extreme temperature, etc). These problems necessitate an inspection for fish health. Also, the time when the frys need to be released will vary due to water temperature, which typically is a function of how far upstream the eggs are placed.

The frys must be timely released for optimum fish health and survivability. Those decisions require inspection, and the window provides a clear understanding of fish development without disturbance.

While various embodiments of the present invention have been described, the invention may be modified and adapted to various operational methods to those skilled in the art. Therefore, this invention is not limited to the description and figures shown herein, and includes all such embodiments, changes, and modifications that are encompassed by the scope of the claims.

The invention claimed is:

1. An assembly to provide protection for incubating fish in a river comprising:
   A) an incubation assembly comprising:
      a) a perforated incubation tray,
      b) an incubation cover panel positioned over said incubation tray,
      c) said incubation cover panel having a first window opening covered by a glass plate,
   B) a cover assembly comprising:
      a) a base panel,
      b) a side panel assembly connected to said base panel,
      c) said side panel assembly further comprising:
         i) a pair of forward side panels and a pair of rearward side panels,
         ii) said forward side panels each having a louver positioned over an opening, and
         ii) said rearward side panels each having a plurality of openings,
      d) an outer cover panel positioned over said side panel assembly,
      e) said outer cover panel having a second window opening,
   C) said incubation assembly is positioned:
      a) between said base panel and said outer cover,
      b) within said side panel assembly,
   D) whereby said incubating fish are viewable through said first window opening and said second window opening.

2. The assembly according to claim 1 further comprising:
   A) said base panel being in the shape of an irregular six sided polygon,
   B) said base panel having a peripheral bent edges that are folded downwardly by about 5 degrees, and
   C) said base panel incorporating a plurality of slots positioned underneath said incubation assembly.

3. The assembly according to claim 1, wherein said incubation assembly and said cover assembly are made from a metal.

4. The assembly according to claim 1, wherein said plurality of openings are placed in number and position according to a predetermined pattern.

5. The assembly according to claim 1, wherein said positioning of said incubation assembly incorporates spacers.

6. The assembly according to claim 1, wherein said incubation tray comprises a horizontal base panel and four vertical panels.

7. The assembly according to claim 1, wherein said incubation cover panel is connected to said incubation tray by a hinge, said outer cover is connected to said side panel assembly by a hinge.

8. The assembly according to claim 1, wherein a pair of guiding panels are connected to said side panel assembly, and said guiding panels are positioned distal to said louvers.

9. The assembly according to claim 1, wherein a lid is positioned above said second window opening, said lid is connected to said outer cover panel by a hinge.

10. A method of protecting incubating fish in a river comprising:
   A) providing:
      a) an incubation assembly comprising:
         i) a perforated incubation tray,
         ii) an incubation cover positioned over said incubation tray,
         iii) said incubation cover having a first window opening covered by a glass plate,
      b) a cover assembly comprising:
         i) a base panel,
         ii) a side panel assembly connected to said base panel,
         iii) said side panel assembly further comprising:
            1) A pair of forward side panels and a pair of rearward side panels,
            2) said forward side panels each having a louver positioned over an opening, and
            3) said rearward side panels each having a plurality of openings,
         iii) an outer cover positioned over said side panel assembly,
            iv) said outer cover having a second window opening,
      c) said incubation assembly is positioned:
         i) between said base panel and said outer cover,
         ii) within said side panel assembly,
      d) whereby said incubating fish are viewable through said first window opening and said second window opening,
   B) positioning fish eggs into said incubation tray, and
   C) positioning said cover assembly in a river.

11. The method according to claim 10 further comprising:
   A) said base panel being in the shape of an irregular six sided polygon,
   B) said base panel having a peripheral bent edges that are folded downwardly by about 5 degrees, and
   C) said base panel incorporating a plurality of slots positioned underneath said incubation assembly.

12. The method according to claim 10, wherein said incubation assembly and said cover assembly are made from a metal.

13. The method according to claim 10, wherein said plurality of openings are placed in number and position according to a predetermined pattern.

14. The method according to claim 10, wherein said positioning of said incubation assembly incorporates spacers.

15. The method according to claim 10, wherein said incubation tray comprises a horizontal base panel and four vertical panels.

16. The method according to claim 10, wherein said incubation cover is connected to said incubation tray by a hinge, said outer cover is connected to said side panel assembly by a hinge.

17. The method according to claim 10, wherein a pair of guiding panels are connected to said side panel assembly, and said guiding panels are positioned distal to said louvers.

18. The method according to claim 10, wherein a lid is positioned above said second window opening, said lid is connected to said outer cover panel by a hinge.

* * * * *